US012033826B2

(12) United States Patent
Ngo

(10) Patent No.: US 12,033,826 B2
(45) Date of Patent: Jul. 9, 2024

(54) OHMNI-SWITCH

(71) Applicant: Phu Dac Ngo, Glassboro, NJ (US)

(72) Inventor: Phu Dac Ngo, Glassboro, NJ (US)

(73) Assignee: Phu D Ngo, Glassboro, NJ (US)

( * ) Notice: Subject to any disclaimer, the term of this patent is extended or adjusted under 35 U.S.C. 154(b) by 408 days.

(21) Appl. No.: 16/949,173

(22) Filed: Dec. 7, 2020

(65) Prior Publication Data

US 2022/0181098 A1 Jun. 9, 2022

(51) Int. Cl.
*G08B 21/00* (2006.01)
*H01H 9/02* (2006.01)
*H01H 9/16* (2006.01)
*H05B 47/19* (2020.01)

(52) U.S. Cl.
CPC .......... *H01H 9/168* (2013.01); *H01H 9/0271* (2013.01); *H01H 2300/032* (2013.01); *H05B 47/19* (2020.01)

(58) Field of Classification Search
CPC ................ H01H 9/168; H01H 9/0271; H01H 2300/032; H05B 47/19
USPC .......................................................... 340/644
See application file for complete search history.

(56) References Cited

U.S. PATENT DOCUMENTS

| | | | | |
|---|---|---|---|---|
| 5,895,985 A * | 4/1999 | Fischer | ............... | H02J 13/0017 307/34 |
| 9,888,337 B1 * | 2/2018 | Zalewski | ............. | H02N 11/002 |
| 2005/0102377 A1 * | 5/2005 | King | ....................... | H04L 67/14 709/219 |
| 2011/0080046 A1 * | 4/2011 | Lee | ......................... | G06F 1/266 307/39 |
| 2016/0261113 A1 * | 9/2016 | Wiggins | ............ | H02J 13/00006 |
| 2021/0091822 A1 * | 3/2021 | Alpert | .................... | H04B 3/546 |

* cited by examiner

*Primary Examiner* — Mark S Rushing

(57) ABSTRACT

The Ohmni-Switch is a system that enables a person to use an existing wall switch/receptacle circuit to control outlets that are not wired in that existing wall switch/receptacle circuit. The transmitter and receiver circuits will be housed in a sealed plastic case. All external surfaces of the devices will not have any contact with the house 120 VAC mains.

1 Claim, 2 Drawing Sheets

Ohmni-Switch Functional Diagram with wall switch on and light on.

Ohmi-Switch Receiver:
The receiver is designed to plug into receptacles and uses a rectifier to power its onboard circuitry. The user can select from multiple RF channels that will pair the receiver up with the desired Ohmni-Switch transmitter.
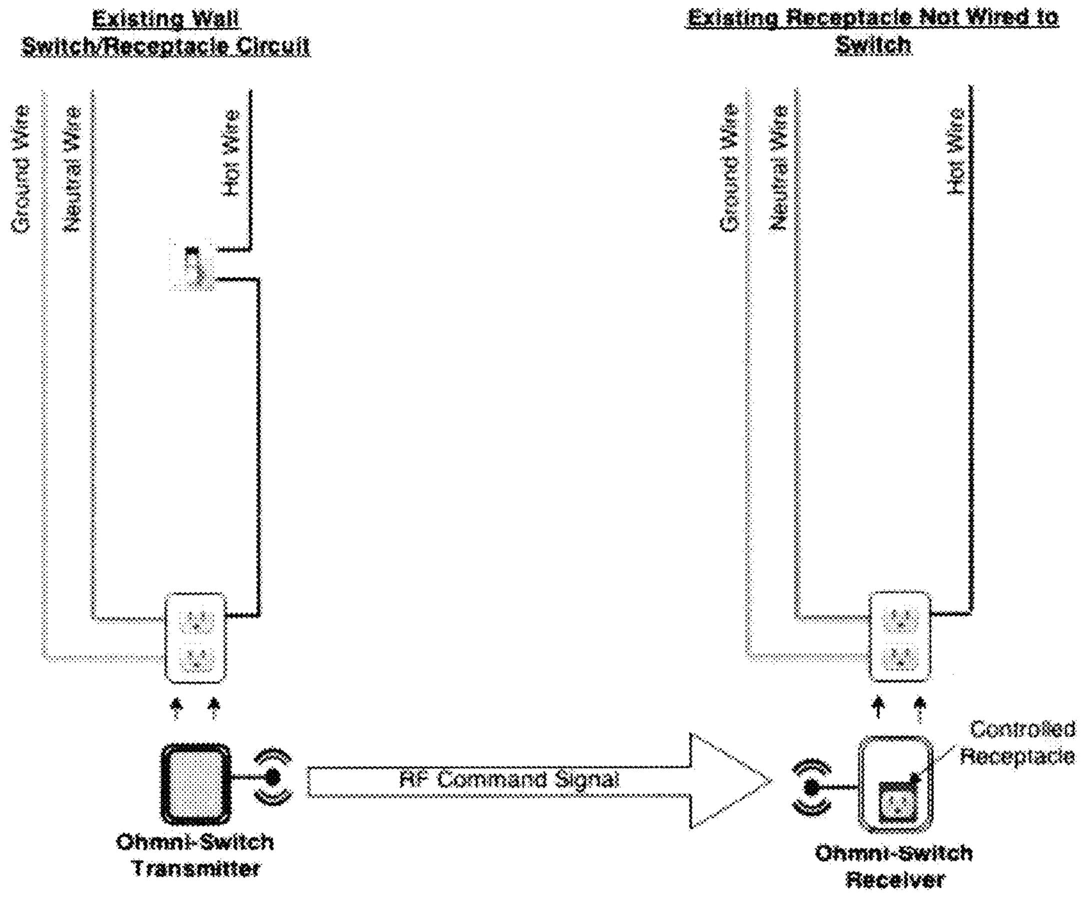
Figure 1: Ohmni-Switch Functional Diagram

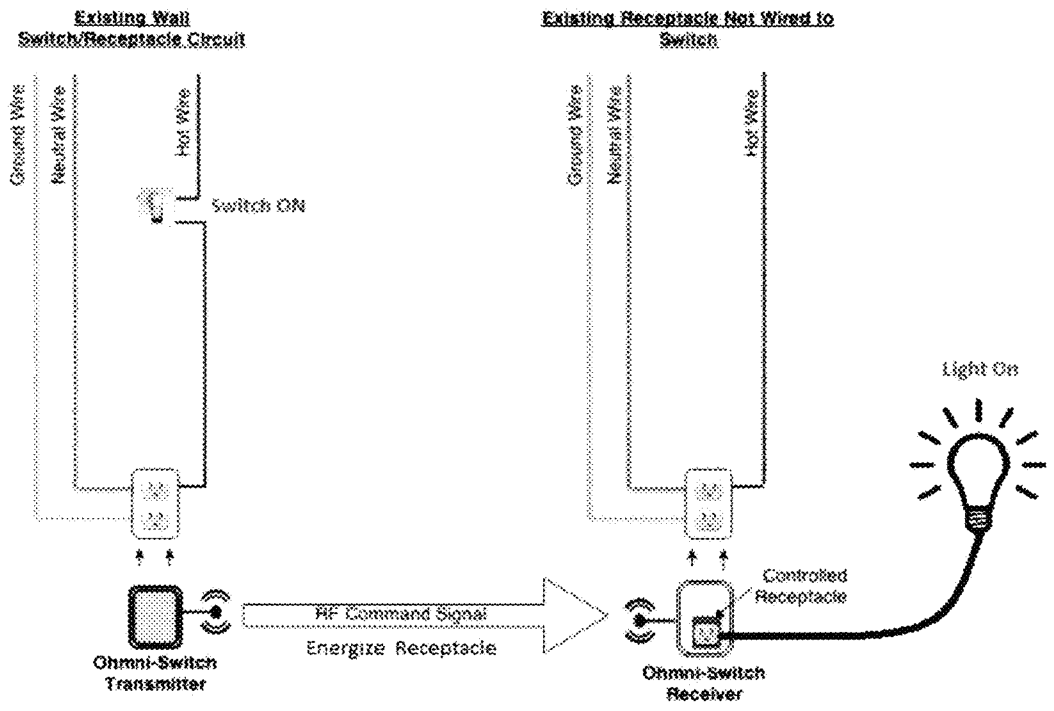
Figure 2: Ohmni-Switch Functional Diagram with wall switch on and light on.
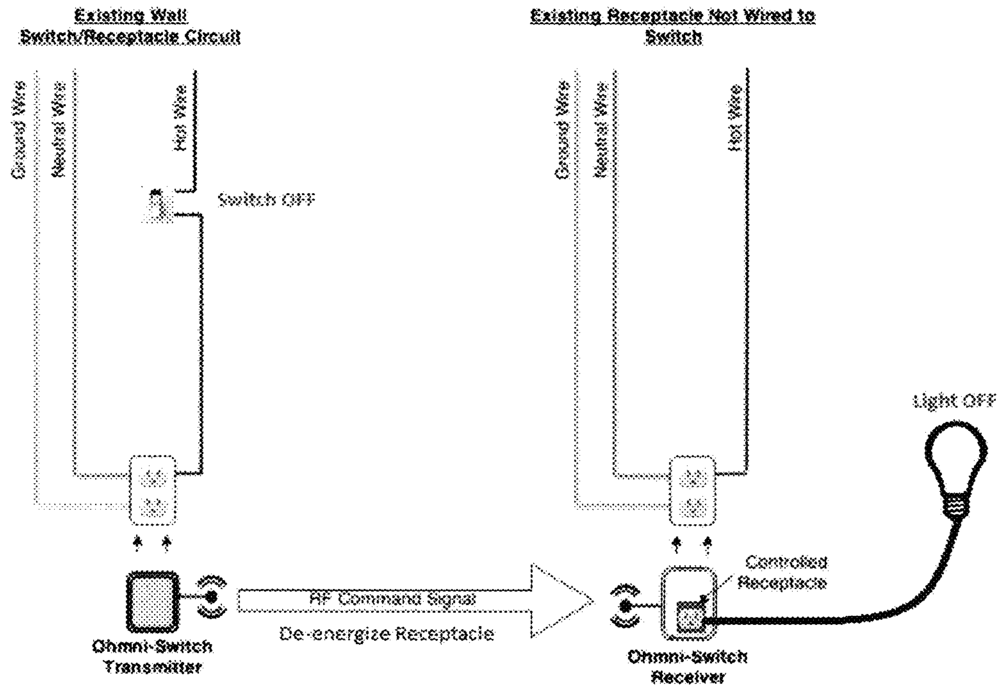
Figure 3: Ohmni-Switch Functional Diagram with wall switch off and light off.

OHMNI-SWITCH

OVERVIEW

The Ohmni-Switch is a system that enables a person to use an existing wall switch/receptacle circuit to control outlets that are not wired in that existing wall switch/receptacle circuit.

The transmitter and receiver circuits will be housed in a sealed plastic case. All external surfaces of the devices will not have any contact with the house 120 VAC mains.

SPECIFICATIONS

Transmitter is equipped with the following components:

1. Nema 5-15 Type B plug
 a. This will be used to plug into the standard NEMA 5-15 wall outlet supplying our power supply with 120 VAC.
2. 120 VAC to 3.3 VDC, 600 mA power supply
 a. Used to supply 3.3 VDC to our microcontroller, RF module and relay.
3. Microcontroller (MSP430)
 a. Programmed send information to the RF modules.
 b. Outputs control the relay.
4. Low Power Wireless RF Transmitter Module (NRF24L01)
 a. 2.4 GHz with 125 Channels
 b. Used to facilitate wireless communication between itself and other RF modules in this case the receiver module.

Receiver is equipped with the following components:

5. Nema 5-15 Type B plug
 a. This will be used to plug into the standard NEMA 5-15 wall outlet supplying our power supply with 120 VAC.
6. 120 VAC to 3.3 VDC, 600 mA power supply
 a. Used to supply 3.3 VDC to our microcontroller, RF module and relay.
7. Microcontroller (MSP430)
 a. Programmed receive information from the RF modules.
 b. Outputs control the relay.
8. Low Power Wireless RF Transmitter Module (NRF24L01)
 a. 2.4 GHz with 125 Channels
 b. Used to facilitate wireless communication between itself and other RF modules in this case the transmitter.
9. General Purpose Relay
 a. 3.3 V coil operation
 b. Rated to switch 20 Amps at 120 VAC
 c. Used to switch the load (light, TV, other appliances)
 d. Receives a command from the microcontroller to open or close which will turn the appliance on or off.
10. Nema 5-15 Type B receptacle
 a. Used to accept standard 120 VAC, 15 Amp plugs The Ohmni-Switch is a system that enables a person to use an existing wall switch/receptacle circuit to control outlets that are not wired in that existing wall switch/receptacle circuit.

Required System Components:

Ohmni-Switch Transmitter

Ohmni-Switch Receiver

Existing wired wall switch and its receptacle

Receptacle(s) not wired to switch

DESCRIPTION OF THE DRAWINGS:

FIG. 1 shows an existing wall with the ohmni switch plugged into the electrical outlet and an ohmni receiver in another electrical outlet.

FIG. 2 shows turning the light ON at a switch where the ohmni switch is plugged into.

FIG. 3 shows turning the light OFF at a switch where the ohmni switch is plugged into.

BEST MODE OF THE INVENTION:

FIG. 1 shows the system incorporates the muscle memory of a person flipping an existing wall switch (8) at the existing wall circuit (5) to control the receptacles (3) not wired to the wall switch's circuit (6). The Ohmni-Switch transmitter (2) is designed to plug into a wall receptacle (1) that is control by an existing wall switch (8). When the Ohmni-Switch transmitter (2) is energized by the receptacle (1) via the existing wall switch (8), the Ohmni-Switch transmitter (2) will power up and send an RF command signal to the Ohmni-Switch receiver (4).

FIG. 2 shows the Ohmni-Switch receiver (4) uses the command to energize its receptacle (3), whereby giving energy to the light (7) in the wall switch's circuit (6). The ohmni switch transmitter (2) is to be placed at where any switches (8) are located as the master control. As to the ohmni switch receiver (4), this can be placed at any location in the house, office, or electrical access that is desired to control a light bulb, fan, or electrical devices. The ohmni switch transmitter (2) and the ohmni switch receiver (4) is to minimize or prevent rewiring to the existing home or office.

FIG. 3 shows when the light switch (8) is turned off causing the Ohmni Switch transmitter to de-energized and shutting off electricity to the light bulb (7). Furthermore, the ohmni switch receiver (4) can have multiple controlled receptacles (3) for multiple devices that needs access to power.

Ohmni-Switch Transmitter (2): The transmitter is designed to plug into receptacles and uses a rectifier to power its onboard circuitry. The user can select from multiple RF channels that communicate with Ohmni-Switch receivers on the desired channel.

Ohmi-Switch Receiver (4): The receiver is designed to plug into receptacles and uses a rectifier to power its onboard circuitry. The user can select from multiple RF channels that will pair the receiver up with the desired Ohmni-Switch transmitter.

Ohmni Switch Transmitter (2) is equipped with the following components:

1. Nema 5-15 Type B plug
 a. This will be used to plug into the standard NEMA 5-15 wall outlet supplying our power supply with 120 VAC.
2. 120 VAC to 3.3 VDC, 600 mA power supply
 a. Used to supply 3.3 VDC to our microcontroller, RF module and relay.
3. Microcontroller (MSP430)
 a. Programmed send information to the RF modules.
 b. Outputs control the relay.
4. Low Power Wireless RF Transmitter Module (NRF24L01)
 a. 2.4 GHz with 125 Channels
 b. Used to facilitate wireless communication between itself and other RF modules in this case the receiver module.

Ohmni Switch Receiver (4) is equipped with the following components:

5. Nema 5-15 Type B plug
 a. This will be used to plug into the standard NEMA 5-15 wall outlet supplying our power supply with 120 VAC.
6. 120 VAC to 3.3 VDC, 600 mA power supply a. Used to supply 3.3 VDC to our microcontroller, RF module and relay.

7. Microcontroller (MSP430)

a. Programmed receive information from the RF modules.

b. Outputs control the relay.

8. Low Power Wireless RF Transmitter Module (NRF24L01)

a. 2.4 GHz with 125 Channels b. Used to facilitate wireless communication between itself and other RF modules in this case the transmitter.

9. General Purpose Relay a. 3.3 V coil operation b. Rated to switch 20 Amps at 120VAC c. Used to switch the load (light, TV, other appliances)

d. Receives a command from the microcontroller to open or close which will turn the appliance on or off.

10. Nema 5-15 Type B receptacle a. Used to accept standard 120 VAC, 15 Amp plugs.

Design Definition:

The Ohmni-Switch is a system that enables a person to use an existing wall switch/receptacle circuit to control outlets that are not wired in that existing wall switch/receptacle circuit.

Required System Components:

Ohmni-Switch Transmitter

Ohmni-Switch Receiver

Existing wired wall switch and its receptacle

Receptacle(s) not wired to switch

Design Functionality:

The system incorporates the muscle memory of a person flipping an existing wall switch to control the receptacles not wired to the wall switch's circuit. The Ohmni-Switch transmitter is designed to plug into a wall receptacle that is control by an existing switch. When the Ohmni-Switch transmitter's receptacle is energized via the wall switch; the Ohmni-Switch transmitter will power up and send an RF command signal to the Ohmni-Switch receiver. The Ohmni-Switch receiver uses the command to energize its receptacle. When the Ohmni-Switch transmitter's receptacle is de-energized via the wall switch the Ohmni-Switch transmitter will power down and the Ohmni-Switch receiver will de-energize its receptacle.

Ohmni-Switch Transmitter:

The transmitter is designed to plug into receptacles and uses a rectifier to power its onboard circuitry. The user can select from multiple RF channels that communicate with Ohmni-Switch receivers on the desired channel.

The invention claimed is:

1. A system for allowing use of an existing wall switch and receptacle for powering an electrical device, comprising:

a plurality of Ohmni switch transmitters, each configured to communicate at 2.4 Ghz and use 79 communication channels;

an existing electrical receptacle to accept an Ohmni switch transmitter, wherein the existing electrical receptacle has a wall switch electrically connected thereto;

a plurality of Ohmni switch receivers each having a microcontroller, a low power wireless RF receiver module, a relay communicatively coupled to the microcontroller and an outlet to accept a plug from an electrical device;

wherein each Ohmni switch receiver is configured to be plugged into any electrical receptacle except for the existing electrical receptacle, and each Ohmni switch receiver has different RF channels for a user to select from that communicatively pair an Ohmni switch receiver to a desired Ohmni switch transmitter;

wherein the wall switch provides power to the Ohmni switch transmitter that is plugged into the existing electrical receptacle;

wherein once powered the Ohmni switch transmitter transmits an RF command signal to a paired Ohmni switch receiver; and wherein the RF command is received by the microcontroller and is used to switch the relay open to provide power to the electrical device plugged into the outlet.

* * * * *